(12) United States Patent
Ziegler et al.

(10) Patent No.: US 12,206,949 B2
(45) Date of Patent: Jan. 21, 2025

(54) SYNCHRONIZED PLAYBACK OF DATA VISUALIZATIONS FOR DATA SOURCES RELATED TO AN EVENT

(71) Applicant: MICROSOFT TECHNOLOGY LICENSING, LLC, Redmond, WA (US)

(72) Inventors: Anja Liliane Ziegler, Bellevue, WA (US); Kristopher Colvin Borchers, Flower Mound, TX (US); Umesh Kumar, Bellevue, WA (US); Samuel Ketsela Zeleke, Kenmore, WA (US); Manuel Rodriguez Vazquez, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/130,363

(22) Filed: Apr. 3, 2023

(65) Prior Publication Data
US 2024/0334016 A1 Oct. 3, 2024

(51) Int. Cl.
*G06F 3/0484* (2022.01)
*H04N 21/242* (2011.01)
(Continued)

(52) U.S. Cl.
CPC ..... *H04N 21/47217* (2013.01); *H04N 21/242* (2013.01); *H04N 21/44008* (2013.01); *H04N 21/6373* (2013.01)

(58) Field of Classification Search
CPC .... H04N 21/472; H04N 21/242; H04N 21/44; H04N 21/6373; G06F 3/0484
See application file for complete search history.

(56) References Cited

U.S. PATENT DOCUMENTS

| 7,265,663 B2 * | 9/2007 | Steele ................. A63F 13/10 |
| | | 701/28 |
| 2007/0198939 A1 | 8/2007 | Gold |

(Continued)

FOREIGN PATENT DOCUMENTS

KR 20130067959 A 6/2013

OTHER PUBLICATIONS

Soni, Maulik, "Event Hub Replay", Retrieved from: https://github.com/msatmsft/event-hub-replay, Jun. 25, 2019, 3 Pages.

*Primary Examiner* — Phenuel S Salomon
(74) *Attorney, Agent, or Firm* — Newport IP, LLC; Jacob P. Rohwer

(57) ABSTRACT

The system described herein implements synchronized playback of data related to an event. The system receives information that defines a type of event, as well as a time at which the event occurs. Moreover, the information defines an environment in which the event occurs. The system maps the type of event to data sources associated with the environment. Furthermore, the system maps the time at which the event occurs to a predefined timeframe that precedes and/or overlaps with the time at which the event occurs. The system retrieves respective datasets from the data sources and generates respective visualizations for the datasets. The system displays the visualizations in a layout and provides user controls that enable a user to implement synchronized playback of the event from the perspective of the data sources. For example, the synchronized playback can cycle through a sequence of data display states for the datasets.

20 Claims, 12 Drawing Sheets

(51) Int. Cl.
    *H04N 21/44*     (2011.01)
    *H04N 21/472*     (2011.01)
    *H04N 21/6373*     (2011.01)

(56) References Cited

U.S. PATENT DOCUMENTS

| | | | |
|---|---|---|---|
| 2007/0213920 A1* | 9/2007 | Igarashi | F02D 29/02 |
| | | | 701/114 |
| 2009/0276106 A1 | 11/2009 | Doan | |
| 2009/0327856 A1* | 12/2009 | Mouilleseaux | G06F 16/70 |
| | | | 715/230 |
| 2014/0046550 A1* | 2/2014 | Palmer | G08G 1/167 |
| | | | 701/33.4 |
| 2014/0198105 A1* | 7/2014 | Gibson | G06F 16/9038 |
| | | | 345/440 |
| 2014/0226010 A1* | 8/2014 | Molin | H04N 7/01 |
| | | | 340/576 |
| 2017/0337227 A1 | 11/2017 | Abraham et al. | |
| 2018/0046484 A1 | 2/2018 | Baluch et al. | |
| 2019/0292013 A1 | 9/2019 | Ginsberg et al. | |
| 2019/0370233 A1* | 12/2019 | Yamashita | G06F 16/254 |
| 2020/0042657 A1* | 2/2020 | Todd | G06F 30/20 |
| 2020/0383284 A1* | 12/2020 | Larsen | G01N 33/246 |
| 2021/0241320 A1* | 8/2021 | Chaudhari | G06N 20/00 |
| 2022/0138265 A1* | 5/2022 | Morningstar | G06F 3/04842 |
| | | | 715/202 |

* cited by examiner

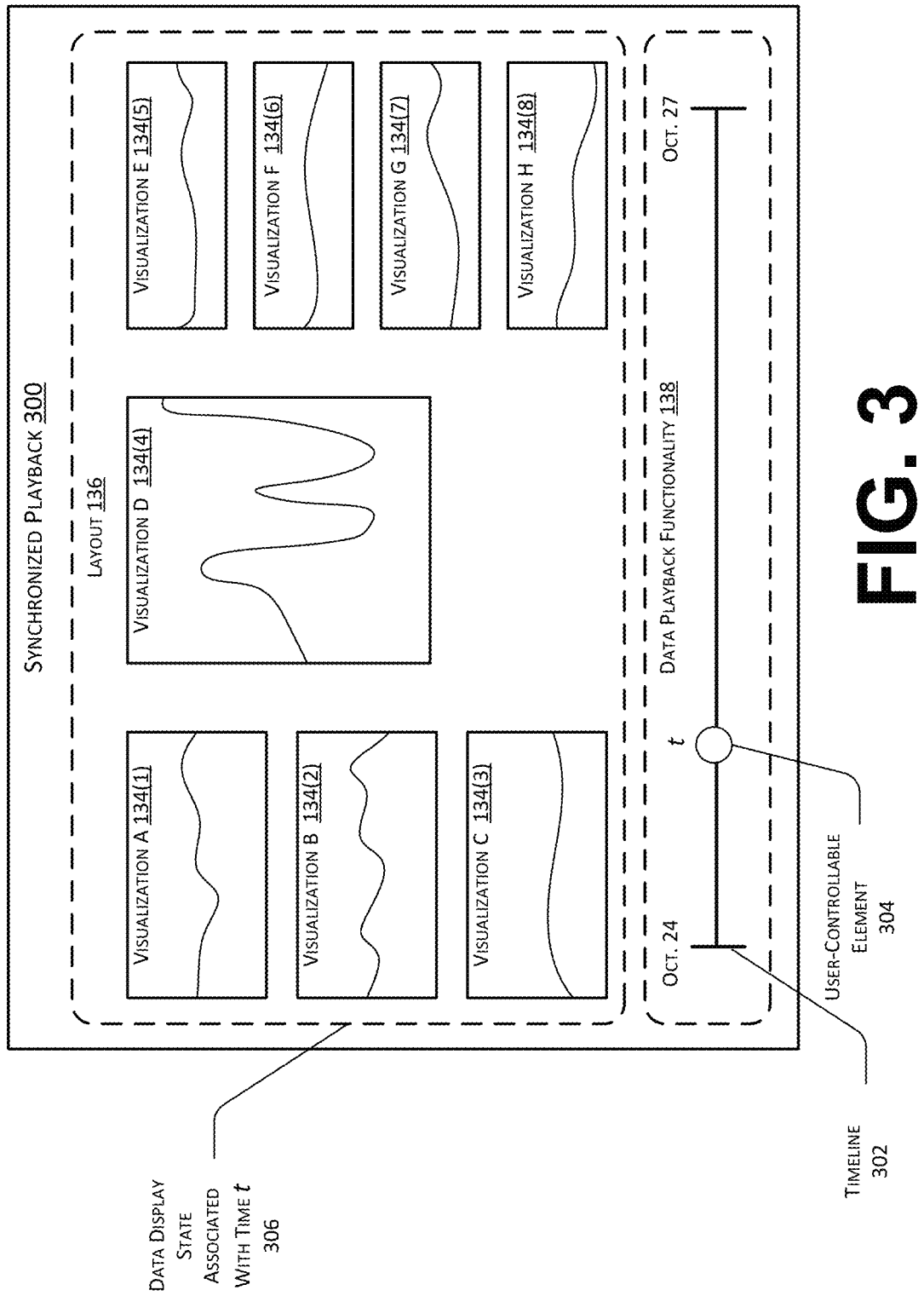

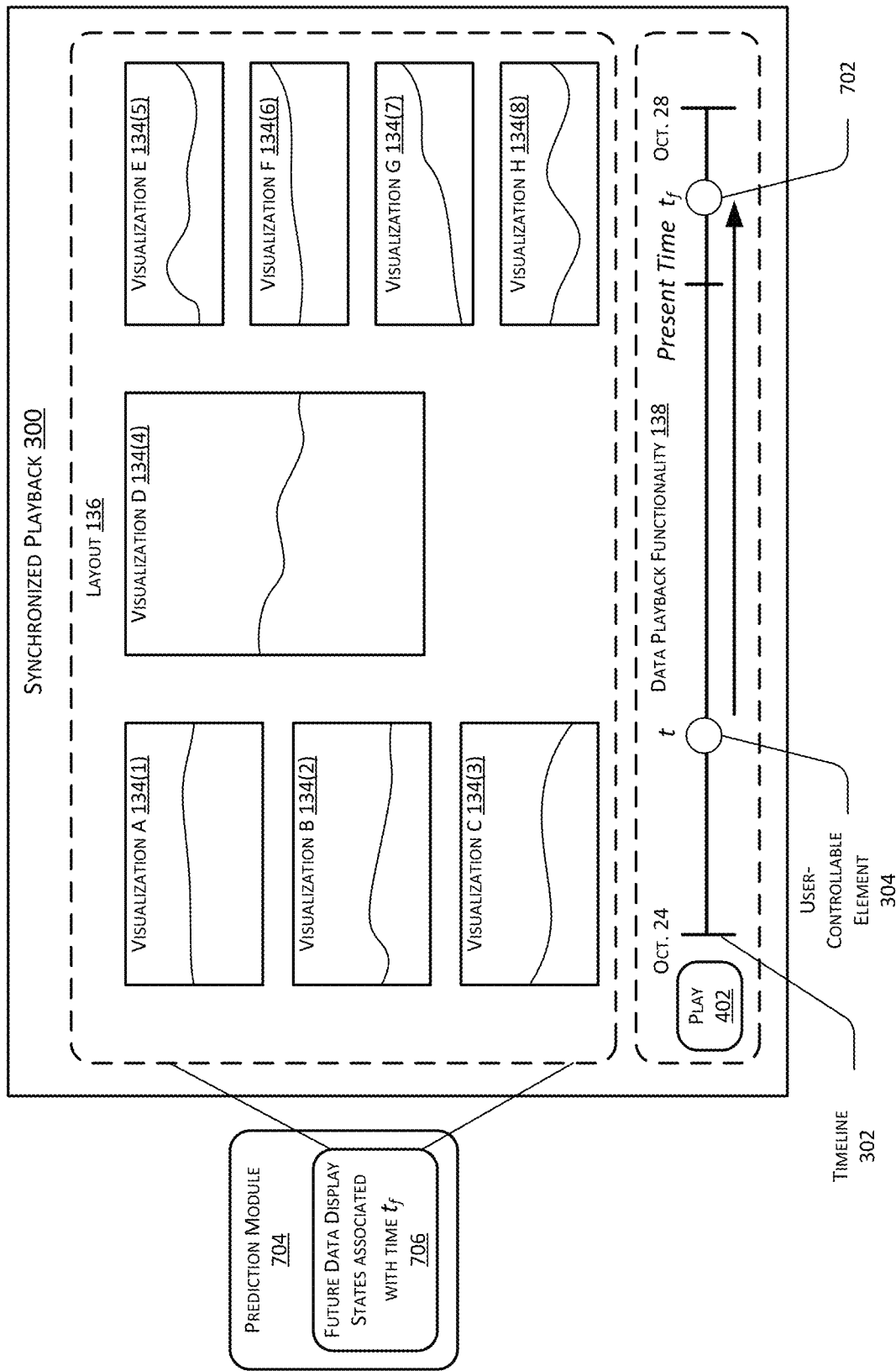

SYNCHRONIZED PLAYBACK OF DATA VISUALIZATIONS FOR DATA SOURCES RELATED TO AN EVENT

BACKGROUND

It is important for various entities to be able to review and/or analyze an event from the perspective of different data sources that are related to the event. For example, the review and/or analysis of an event can be beneficial for recognizing patterns, optimizing business performance, updating system alerts, identifying and/or isolating a fault, and so forth. However, collecting and displaying vast amounts of data from different data sources in order to enable a user to review and/or analyze the event is inefficient and unreliable.

Typically, a user is required to determine which data sources are related to an event, to manually access the data sources to retrieve the data from the data sources, and to manually create a group of visualizations based on the data retrieved from the data sources. After these tasks are completed, the user can generate a report and/or a presentation that includes the group of visualizations. This typical approach is a time-consuming and tedious process. Moreover, this typical approach increases the chances that relevant data is not retrieved and/or displayed for a particular event (e.g., the user is unaware of a relevant data source, the user forgot to retrieve data from a relevant data source), leading to a lack of information or error in the report and/or the presentation generated for the particular event. An additional setback with respect to the typical approach is that the visualizations are only able to show relevant data for a single point in time (e.g., a snapshot of the data).

It is with respect to these and other technical challenges that the disclosure made herein is presented.

SUMMARY

The system described herein provides synchronized playback of data related to an event. The system is configured to receive information that defines a type of event, as well as a time at which the event occurs. Moreover, the information defines an environment in which the event occurs. The system is configured to map the type of event to data sources associated with the environment. Furthermore, the system is configured to map the time at which the event occurs to a predefined timeframe that precedes and/or overlaps with the time at which the event occurs. In one example described below, the event mappings to the data sources and the predefined timeframe are determined by a user. In another example, the event mappings to the data sources and the predefined timeframe are determined by an artificial intelligence model.

The system retrieves respective datasets from the data sources. The respective datasets include data produced by the data sources during the predefined timeframe. Additionally or alternatively, the respective datasets include data stored by the data sources for the predefined timeframe. The system then generates respective visualizations for the datasets and displays the visualizations in a layout that includes different positions. The system further provides user controls that enable a user to implement synchronized playback of the event from the perspective of the data sources. The term synchronized or synchronization captures how the state of the data, which is retrieved from multiple different data sources, is associated with a point in time. Stated alternatively, the synchronized playback can cycle through a sequence of data display states. A current data display state is based on a time that corresponds to a position of a user-controllable element on a displayed timeline. Accordingly, the system described herein enables an improved way in which an event can be viewed from the perspective of data sources related to an event.

As used herein, an environment defines a context in which various types of data are produced and/or stored such that the data can be used to visualize and playback an event for review and/or analysis purposes. For example, the environment can include a set of devices, a whole datacenter, a cloud service and/or cloud system (e.g., a cloud transaction processing service and/or system), a supply chain for a product that is deliverable to customers (e.g., retail locations), and so forth. An event is something that happens or takes place within the environment. To further expand on the examples provided above, the event can be a network disconnection for the set of devices, a power outage within the datacenter, a spike in activity, such as a busy shopping season for the cloud transaction processing service and/or system (e.g., the month of December when Holiday shopping peaks), a stressed supply chain for the product, and so forth. Consequently, the data included in the retrieved datasets is likely to exhibit behavior that is related to the event (e.g., is a root cause of the event, indicates when the event will occur, predicts that the event will occur). The review and/or analysis of the data behavior can be beneficial for understanding complex data scenarios such as recognizing patterns, optimizing business performance, updating system alerts, identifying and/or isolating a fault, and so forth.

A data source is a mechanism (e.g., a device, a monitoring component, a sensor, a database, a data structure) that produces and/or stores data related to an event. In one example, the data is related to a metric that exhibits behavior that is indicative of the event or relevant to the event. Alternatively, the behavior exhibited by the metric can predict an occurrence of the event. Different data sources can be configured to capture different types of data (e.g., different metrics such as data latency and data throughput). Alternatively, different data sources can be configured to capture the same type of data in different circumstances (e.g., a number of item deliveries for two different locations, data latency at two different locations such as different datacenters).

Using the layout of visualizations and the user controls described herein, a user no longer has to perform the manual steps to generate a report and/or a presentation. Rather, via the synchronized playback the system described herein provides an effective and efficient approach to viewing complex data scenarios. For instance, the synchronized playback provides a more meaningful lens for a user to view the data because the synchronized playback can efficiently cycle through a sequence of data display states that span the predefined timeframe. Accordingly, a user is not left viewing a single data display state associated with a lone point in time (e.g., a snapshot view). Nor is the user required to flip through various slides of a slide presentation or pages of a report. Furthermore, using the mappings described herein, data sources that are related to an event are not missed or forgotten. Thus, the synchronized playback of data does not lack information or include errors due to a missed or forgotten data source.

The user controls allow for the user to view different data display states for the datasets. For example, a user can move a user-controllable element from a first time on a timeline representing the predefined timeframe to a second time on the timeline representing the predefined timeframe to view different data states. In another example, the user can playback the data in the datasets at a playback rate (e.g., show a minute's worth of data in a dataset for every second of playback, show an hour's worth of data in a dataset every two seconds of playback). The playback rate can be a default rate or a rate that is defined by the user.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3 illustrates an example graphical user interface in which synchronized playback of an event from the perspective of data sources that are related to the event can be provided.

FIG. 7 illustrates an example graphical user interface based on the example graphical user interface of FIG. 3 in which a current position of the user-controllable element on the timeline is associated with a future time.

DETAILED DESCRIPTION

The techniques described herein implement synchronized playback of data related to an event. The system, described in further detail below, is configured to receive information that defines a type of event, as well as a time at which the event occurs. Moreover, the information defines an environment in which the event occurs. The system is configured to map the type of event to data sources associated with the environment. Furthermore, the system is configured to map the time at which the event occurs to a predefined timeframe that precedes and/or overlaps with the time at which the event occurs. In one example described below, the event mappings to the data sources and the predefined timeframe are determined by a user. In another example, the event mappings to the data sources and the predefined timeframe are determined by an artificial intelligence model.

The system retrieves respective datasets from the data sources. The respective datasets include data produced by the data sources during the predefined timeframe. Additionally or alternatively, the respective datasets include data stored by the data sources for the predefined timeframe. The system then generates respective visualizations for the datasets and displays the visualizations in a layout that includes different positions. The system further provides user controls that enable a user to implement synchronized playback of the event from the perspective of the data sources. Again, the term synchronized or synchronization captures how the state of the data, which is retrieved from multiple different data sources, is associated with a point in time. Stated alternatively, the synchronized playback can cycle through a sequence of data display states. A current data display state is based on a time that corresponds to a position of a user-controllable element on a timeline. Accordingly, the system described herein enables an improved way in which an event can be viewed from the perspective of data sources related to an event.

Various examples, scenarios, and aspects that enable the techniques described herein are described below with respect to FIGS. 1-9.

Figure 1:
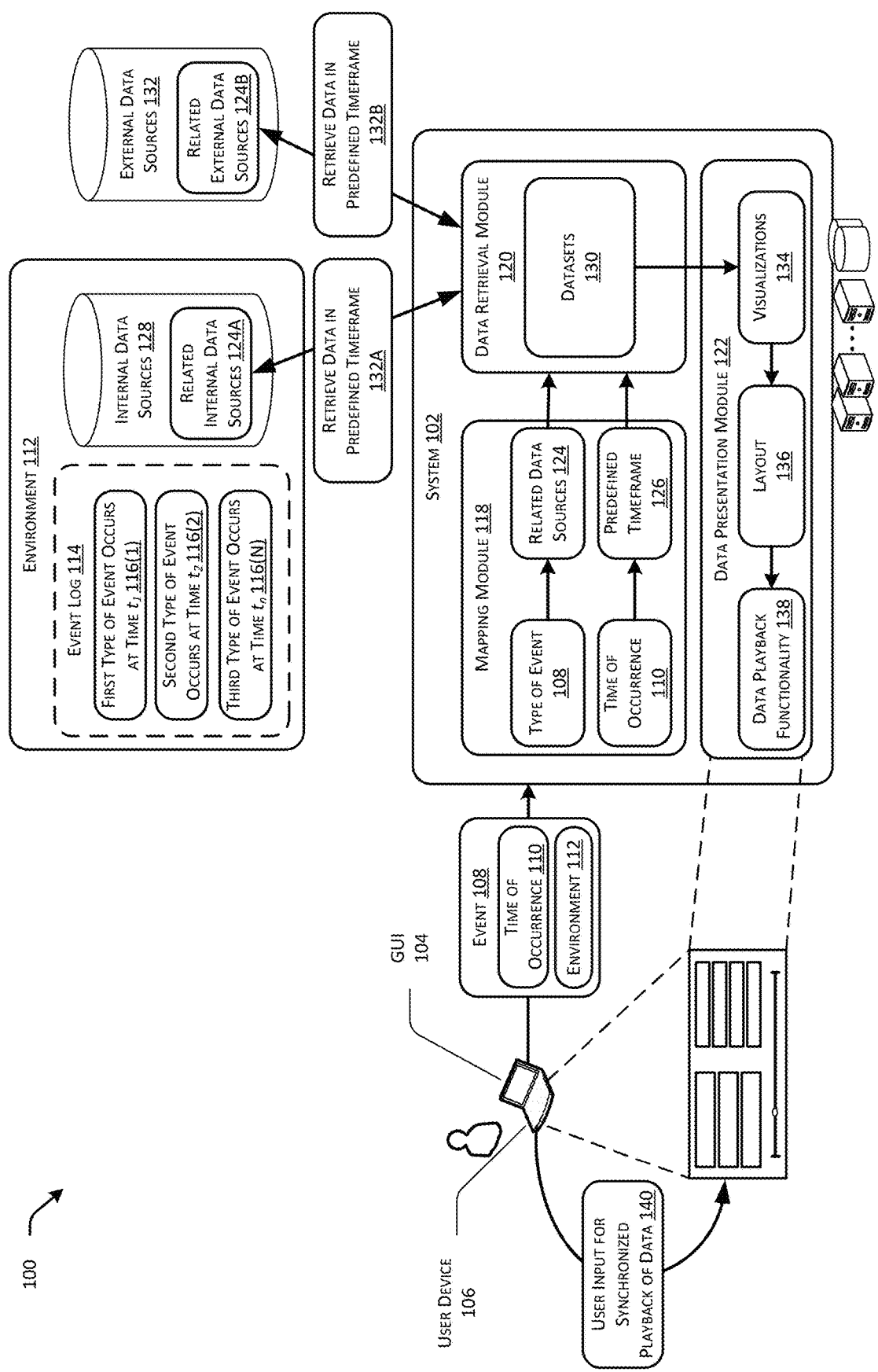
FIG. 1 illustrates an example setting in which a system provides synchronized playback of an event from the perspective of data sources that are related to the event.

FIG. 1 illustrates an example setting 100 in which a system 102 provides synchronized playback of an event from the perspective of data sources that are related to the event. As described above, it can be important for a user to be able to review and/or analyze an event from the perspective of related data sources. For example, the review and/or analysis of an event can be beneficial for recognizing patterns, optimizing business performance, updating system alerts, identifying and/or isolating a fault, and so forth.

Accordingly, in one example, the system 102 is configured to provide exposure to the synchronized playback of the event using a graphical user interface 104 (e.g., a user portal implemented via an application programming interface (API)) displayed on a user device 106. The graphical user interface 104 enables a user to submit information to the system 102. The information includes an identification and/or a description of an event 108. The identification and/or the description of the event 108 includes a time of occurrence 110 for the event 108 and/or an identification of an environment 112 in which the event 108 occurs.

An environment 112 defines a context in which various types of data is produced and/or stored such that the data can be used to visualize and playback the event 108 for review and/or analysis purposes. For example, the environment 112 can include a set of devices, a whole datacenter, a cloud service and/or cloud system (e.g., a cloud transaction processing service and/or system), a supply chain for a product that is deliverable to customers (e.g., retail locations), and so forth. An event is something that happens or takes place within the environment 112. Generally, different types of events can be logged (e.g., recorded) in an event log 114 associated with the environment 112. As shown in FIG. 1, the event log 114 includes a first type of event that occurs at time $t_1$ 116(1), a first type of event that occurs at time $t_2$ 116(2), and an nth type of event that occurs at time $t_n$ 116(N), where N represents any number of logged events and n represents any time at which a logged event occurs.

In relation to the examples provided above in the preceding paragraph, the identification and/or the description of the event 108 can reflect a network disconnection for the set of devices at a particular point in time (e.g., Oct. 27, 2022 at 4:15 PM), a power outage within the datacenter at a particular point in time (e.g., Oct. 29, 2022 at 11:09 AM), a spike in activity, such as a busy shopping season for the cloud transaction processing service and/or system (e.g., the month of December when Holiday shopping peaks), a stressed supply chain for the product during a particular week (e.g., the week of Oct. 17, 2022), and so forth. Consequently, there is a variety of different types of events 116(1-N) that may be important to replay for different environments 112. Moreover, the time of occurrence 110 may reflect a wide range of time indicators for an event (e.g., an exact minute at which an event occurs compared to an event that spans a period of time such as a day, a week, a month, and so forth).

As further described below, the system 102 includes a mapping module 118, a data retrieval module 120, and a data presentation module 122. The number of illustrated modules in FIG. 1 is just an example, and the number can vary. That is, functionality described herein in association with the illustrated modules 118, 120, 122 can be performed by a fewer number of modules or a larger number of modules on one device or spread across multiple devices of the system 102.

The mapping module 118 receives the event 108 including the time of occurrence 110 and the identification of the environment 112 in which the event 108 occurs. The mapping module 118 is configured to map the event 108 to related internal data sources 124A and related external data sources 124B (collectively "related data sources 124") based on a type of the event (e.g., based on the identification and/or description of the event 108), as further described below with respect to FIGS. 2A and 2B. Moreover, the mapping module 118 is configured to map the time of occurrence 110 to a predefined timeframe 126.

A related data source 124 is a mechanism (e.g., a device, a monitoring component, a sensor, a table, a structure) that produces and/or stores data related to the event 108. In one example, the data is related to metric and the data exhibits behavior that is indicative of the event 108. Alternatively, the behavior exhibited by the data can be predictive of the event 108. Different data sources can be configured to capture different types of data (e.g., different metrics such as data latency and data throughput) or the same type of data for different circumstances (e.g., a number of item deliveries for two different locations, data latency at two different locations such as different datacenters).

Accordingly, the environment 112 includes internal data sources 128. Turning back to the system 102, the data retrieval module 120 receives the related data sources 124 and the predefined timeframe 126 from the mapping module 118. The data retrieval module 120 then retrieves datasets 130 from the related data sources 124. FIG. 1 illustrates that a related data source 124 can be or include an internal data source 128 (as represented by 124A). FIG. 1 further illustrates that a related data source 124 may additionally or alternatively be or include an external source 132 (as represented by 124B). An external source 132 produces and/or stores data outside, or independent of, the environment 112. For instance, an external data source 132 may be the temperature or some other weather-related metric that is produced and stored by an entity (e.g., a government agency, a news weather department) that is separate from an entity operating the environment 112.

Therefore, the data retrieval module 120 is configured to retrieve data in the predefined timeframe from related internal data sources 124A and/or from related external data sources 124B, as represented by 132A and 132B. Via the aforementioned mappings, the retrieved data is filtered to make the system more efficient. The amount of retrieved data is filtered because the data retrieval module 120 does not retrieve data from all of the internal data sources 128 and/or all of the external data sources 132. Rather, the data retrieval module 120 only retrieves data from data sources that are determined to be related to the event 108 (e.g., the related data sources 124A and/or 124B). Additionally, the data retrieved from an individual data source is limited to the data that is produced and/or stored during the predefined timeframe 126. Thus, the data retrieval module 120 is not retrieving an unnecessary, endless amount of data. Consequently, computing resources (e.g., processor cycles, allocated memory) are conserved.

The retrieved data from the related data sources 124A and/or 124B composes the datasets 130. A dataset 130, therefore, includes data produced and/or stored by an individual related data source 124 during the predefined timeframe 126. As described above, the data spread amongst the datasets 130 is likely to exhibit behavior that is related to the event 108 (e.g., indicates or predicts the event). The review and/or analysis of the data behavior can be beneficial for understanding complex data scenarios such as recognizing patterns, optimizing business performance, updating system alerts, identifying and/or isolating a fault, and so forth.

The data retrieval module 120 passes the datasets 130 to the data presentation module 122. The data presentation module 122 generates respective visualizations 134 for the datasets 130 and generates the respective visualizations 134 for display in a layout 136 that includes different positions. The data presentation module 122 further provides data playback functionality 138 in the form of user controls. The data playback functionality 138 enables a user to provide input 140 to implement synchronized playback of the event 108 from the perspective of the related data sources 124. The term synchronized in this context refers to time synchronization. Accordingly, the synchronized playback of data can illustrate a sequence of data display states for the respective datasets 130 retrieved from the related data sources 124. A current synchronized data display state is based on a time that corresponds to a position of a user-controlled element.

Consequently, the system 102 enables an improved way in which an event 108 can be viewed from the perspective of data sources related to an event. Using the layout 136 for the visualizations 134 and the data playback functionality 138 further described below, a user no longer has to perform the manual steps to generate a report and/or a presentation. Moreover, the synchronized playback provides a more meaningful lens for a user to view the data because the synchronized playback can efficiently cycle through a sequence of data display states that span the predefined timeframe 126. Accordingly, a user is not left viewing a single data display state associated with a lone point in time (e.g., a snapshot view). Furthermore, using the mappings described herein, data sources that are related to an event are not missed or forgotten. Thus, the synchronized playback of data does not lack information or include errors due to a missed or forgotten data source.

Figure 2A:
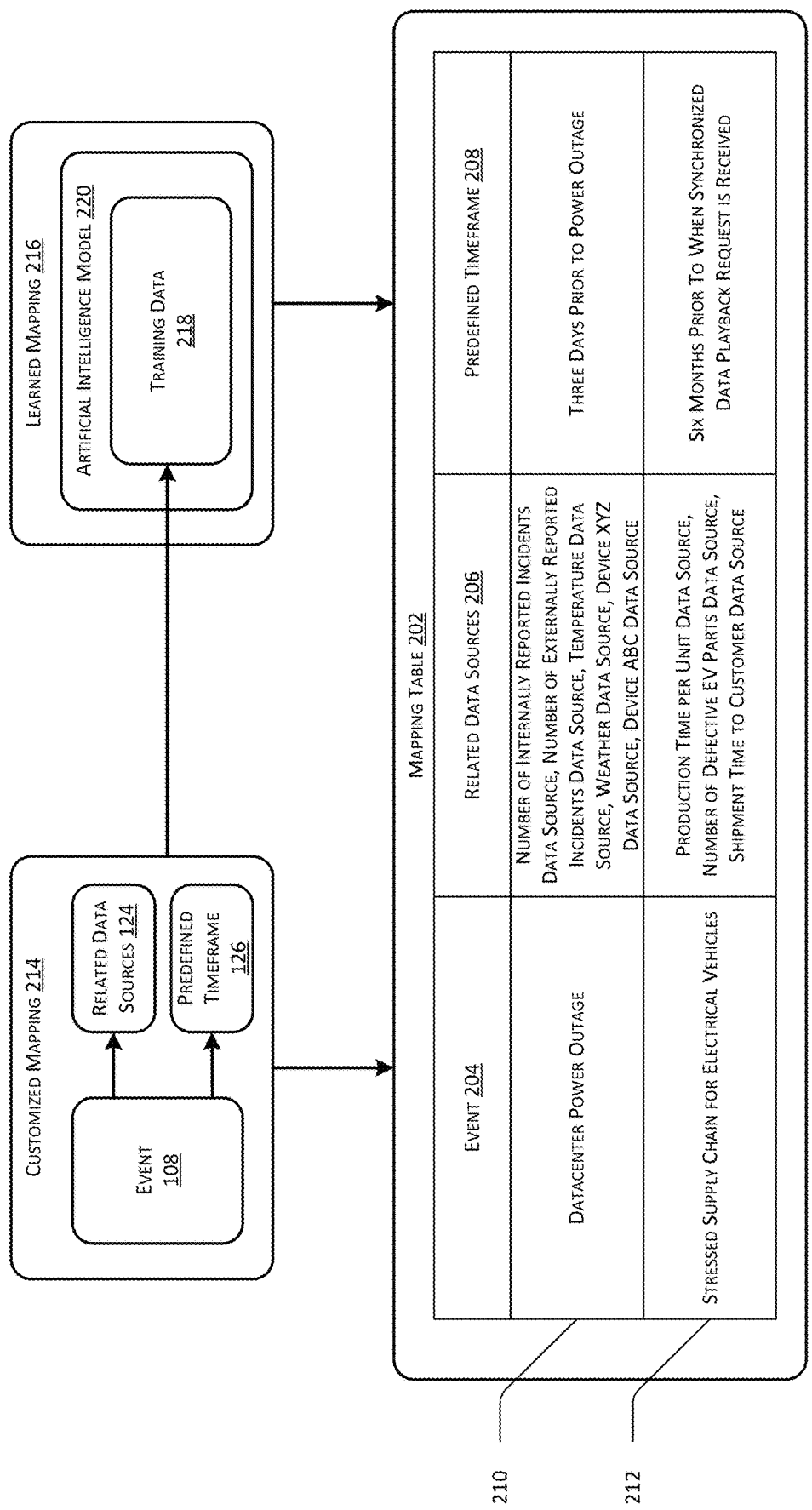
FIG. 2A illustrates an example table that can be used to map an event to related data sources and/or a predefined timeframe, thereby enabling the data retrieval.

FIG. 2A illustrates an example table that can be used to map an event to related data sources and/or a predefined timeframe, thereby enabling the data retrieval. Accordingly, the table is referred to in FIG. 2A as a mapping table 202. As shown, the mapping table 202 includes a column 204 for different events, a column 206 for the data sources related to the events, and a column 208 that specifies a predefined timeframe.

In FIG. 2A, one example mapping 210 in the mapping table 202 includes a "Datacenter Power Outage" event. The mapping 210 associates the "Datacenter Power Outage" event with the following related data sources: "Number of Internally Reported Incidents Data Source", "Number of Externally Reported Incidents Data Source", "Temperature Data Source", "Weather Data Source", "Device XYZ Data Source", and "Device ABC Data Source". The mapping 210 further associates the "Datacenter Power Outage" event with the predefined timeframe of "Three Days Prior to the Power Outage".

Accordingly, if the event 108 received from the user device 106 in FIG. 1 indicates a power outage and an example of the environment 112 for the power outage is "Datacenter XYZ", then the mapping table 202 and/or the mapping 210 identifies the data sources mentioned in the preceding paragraph as ones that are related to the event 108 that occurs in association with "Datacenter XYZ". Furthermore, if the event 108 indicates that a time of occurrence 110 for the power outage is Oct. 27, 2022, then the mapping table 202 and/or the mapping 210 determines that data from Oct. 24, 2022 through Oct. 27, 2022 is to be retrieved from the related data sources to generate the datasets 130. This time period is based on the predefined timeframe—"Three Days Prior to the Power Outage"—as specified in the mapping table 202 for a "Datacenter Power Outage".

Another example mapping 212 in the mapping table 202 is a "Stressed Supply Chain for Electrical Vehicles" event. The mapping 212 associates the Stressed Supply Chain for Electrical Vehicles" event to the following related data sources: "Production Time Per Unit Data Source", "Number of Defective EV Parts Data Source", and "Shipment Time to Customer Data Source". The mapping 212 further associates the Stressed Supply Chain for Electrical Vehicles" event to the predefined timeframe of "Six Months Prior to When Synchronized Data Playback Request is Received".

Accordingly, if the event 108 received from the user device 106 in FIG. 1 indicates a stressed supply chain for electrical vehicles and the environment 112 for the stressed supply chain relates to "EV Company ABC & Vehicle Model XYZ", then the mapping table 202 and/or the mapping 212 identifies the data sources mentioned in the preceding paragraph as ones that are related to the event 108 that occurs in association with "EV Company ABC & Vehicle Model XYZ". Furthermore, if the event 108 indicates that a time of occurrence 110 is the time at which the request to view the synchronized data playback is received (e.g., Oct. 27, 2022), then the mapping table 202 and/or the mapping 212 determines that data from Apr. 24, 2022 through Oct. 27, 2022 is to be retrieved from the related data sources to generate the datasets 130. This time period is based on the predefined timeframe—"Six Months Prior to When Synchronized Data Playback Request is Received"— as specified in the mapping table 202 for a "Stressed Supply Chain for Electrical Vehicles".

The examples discussed above with respect to FIG. 2A illustrate varying degrees at which an event can be defined. For instance, an event can be broadly defined (e.g., a power outage at a datacenter) or more specifically defined (e.g., a stressed supply chain for electrical vehicles). Furthermore, the number of related data sources for the example events is six and three, respectively. These numbers are used for ease of discussion. However, in many complex data scenarios, the number of related data sources accessed for synchronized data playback is higher (e.g., ten data sources, twenty data sources, fifty data sources, one hundred data sources).

Additionally, the identifications (e.g., names) of the data sources used in FIG. 2A have been simplified for ease of discussion. It is understood in the context of this disclosure that data source identifications can be general and applicable to a number of different environments 112 (e.g., outside temperature) or that data source identifications can be specific and applicable to a limited number of different environments or even a single environment.

FIG. 2A further illustrates how the mappings 210, 212 can be added to the mapping table 202. In one example, a user can define a customized mapping 214. The customized mapping 214 associates an event 108 with related data sources 124 and the predefined timeframe 126. Thus, a mapping can be defined by a user. For instance, the user can define which data sources and/or visualizations are to be included in a synchronized playback for a particular event.

In another example, a number of customized mappings 214, including customized mapping 214, can be used to generate a learned mapping 216. That is, the customized mappings can be provided as training data 218 for an artificial intelligence model 220. Accordingly, the artificial intelligence model 220 can determine the related data sources 124 and the predefined timeframe 126 for an event 108. An example artificial intelligence model 220 can utilize various technologies to identify which data sources are generally related to a particular type of event and/or the predefined timeframe for which synchronized data playback is likely to expose meaningful information useable to understand a complex data scenario. For example, the artificial intelligence model 220 can utilize unsupervised clustering, Bayesian networks, representation learning, similarity and metric learning, rule-based machine learning, learning classifier systems, support vector machines ("SVMs"), deep learning, artificial neural networks, associated rule learning, decision tree learning, or other machine learning techniques.

The artificial intelligence model 220 is configured to receive, as inputs, user-specified pertinent information associated with a particular type of event. For example, the user-specified pertinent information may include a name of the type of event, text that describes the type of event, names and/or descriptions of related data sources affected by the type of event, typical locations at which the event occurs or where the data sources are configured, the customized mappings 214, and so forth. This pertinent information typically varies from one user to the next user. Once a large number of users (e.g., hundreds, thousands) have provided the pertinent information, the artificial intelligence model 220 learns a common or a core group of related data sources to a particular type of event. Moreover, the artificial intelligence model 220 learns a common or a core timeframe for a particular type of event. The common or the core group of related data sources and/or the common or the core timeframe can then comprise the learned mappings 216.

Figure 2B:
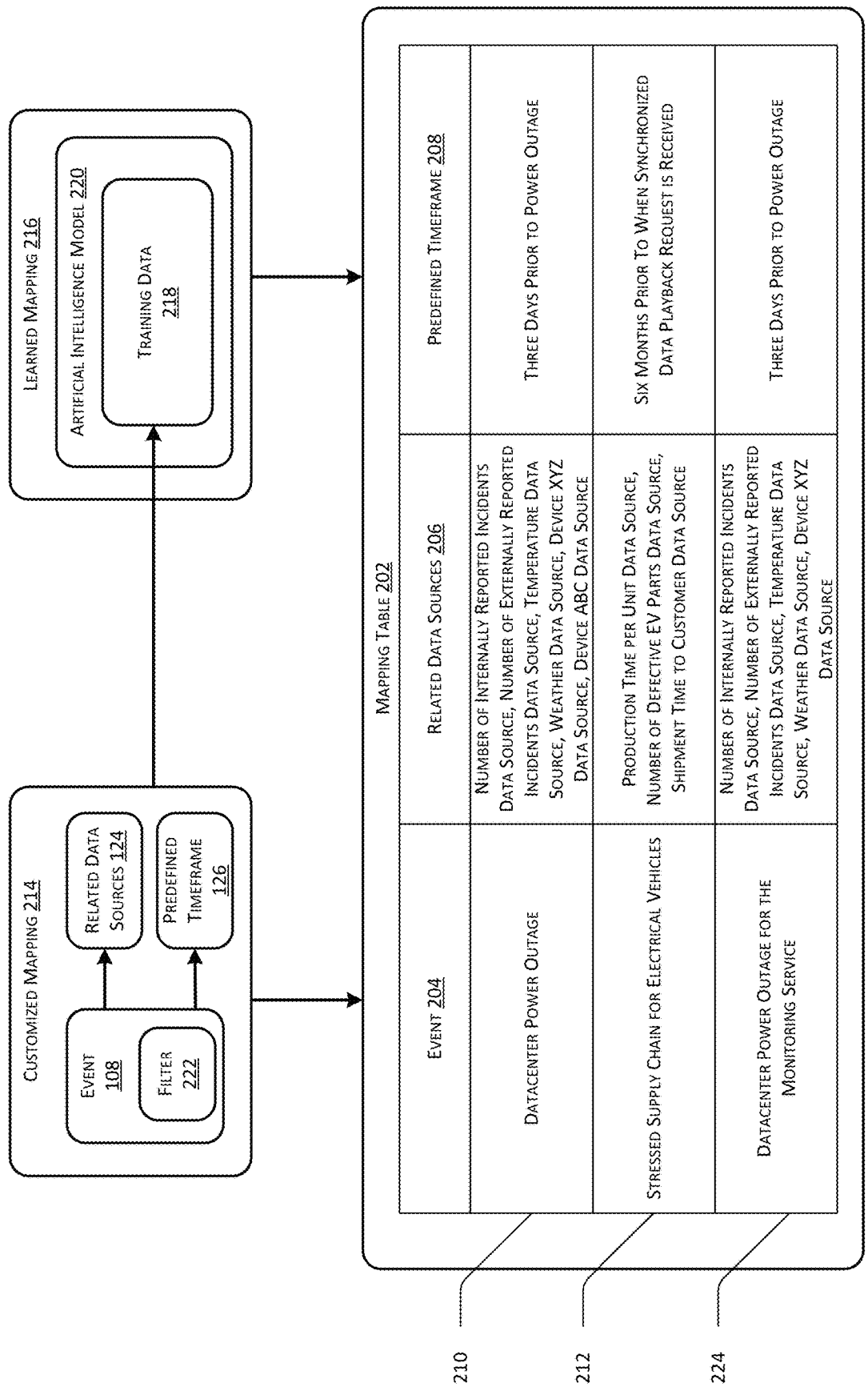
FIG. 2B illustrates the example table of FIG. 2A, where a filter is used to create another mapping in the mapping table that has a reduced number of data sources when compared to an existing mapping in the mapping table.

FIG. 2B illustrates the example table of FIG. 2A, where a filter 222 is used to create another mapping 224. The mapping 224 is similar to another mapping 210 in the mapping table, but the filter 222 is used to reduce the number of the related data sources. For instance, FIG. 2B indicates that the filter 222 for the event 108 specifies that only data associated with a "Datacenter Power Outage" and the "Monitoring Service" should be retrieved, as shown via the mapping 224. Consequently, the number of related data sources in the mapping 224 is less than the number of related data sources in the mapping 210 (e.g., "Device ABC data source" is not relevant to the "Monitoring Service").

FIG. 3 illustrates an example graphical user interface in which synchronized playback 300 of an event from the perspective of data sources that are related to the event can be provided. As shown, the graphical user interface includes the layout 136 of visualizations 134 and the data playback functionality 138. The visualizations 134 in the graphical user interface include visualizations A-H 134(1-8), which correspond to related data sources A-H. The visualizations A-H 134(1-8) are line graph visualizations. However, the types of visualizations can vary and, for example, can alternatively be bar graphs, pie graphs, scatter plots, heat maps, box plots, line charts, maps, or a combination thereof. The type of visualizations used can be a default type of a user-defined type.

The data playback functionality 138 includes a timeline 302 on which a user-controllable element 304 can be positioned. The timeline 302 represents the predefined timeframe 126. In the example of FIG. 3, the timeline 302 represents a time period from October 24 to October 27. The graphical user interface presents a data display state that is associated with a time t 306. The time t is determined based on a position of the user-controllable element 304 on the timeline 302, as illustrated. Accordingly, the data displayed in the visualizations 134(1-8) is associated with time t.

In the example of FIG. 3, if a user moves the user controllable element 304 on the timeline 302 from the position associated with time t to another position, the data presentation module 122 replaces the data display state that is associated with a time t 306 with another data display state based on the other position of the user controllable element 304 on the timeline 302.

Figure 4:
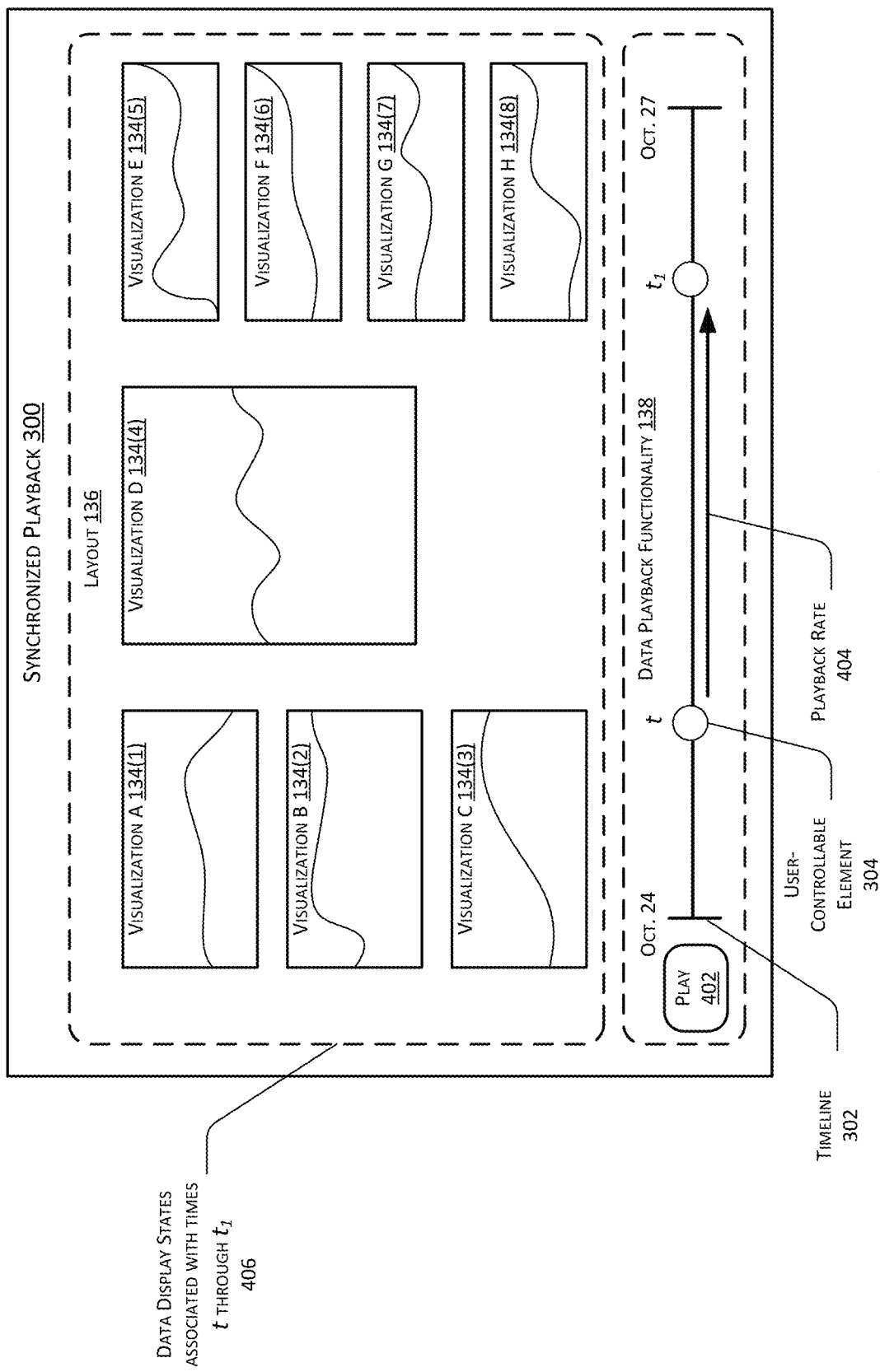
FIG. 4 illustrates an example graphical user interface based on the example graphical user interface of FIG. 3 in which a plurality of data display states can be synchronously played back at a playback rate.

FIG. 4 illustrates an example graphical user interface based on the example graphical user interface of FIG. 3 in which a plurality of data display states can be synchronously played back at a playback rate. As illustrated, the data playback functionality can include a "play" graphical user interface element 402. Other types of graphical user interface elements related to other data playback functions can also be included (e.g., a fast-forward element, a rewind element). When the play graphical user interface element 402 is selected, the data presentation module 122 is configured to play through data display states at a playback rate 404. As shown in FIG. 4, the layout 136 of visualizations 134(1-8) cycle through, at the playback rate 404, data display states that occur between time t and time $t_1$ 406.

The playback rate 404 can be defined based on user input. For instance, a first user that wants to obtain a general understanding of a complex data scenario may want the presentation to cycle through data display states faster compared to a second user that wants to deeply understand the complex data scenario. Accordingly, the first user may define the playback rate 404 so that the synchronized playback illustrates ten minutes' worth of data every second of playback. The second user may define the playback rate 404 so that the synchronized playback illustrates a minute's worth of data in every second of playback. Alternatively, the playback rate 404 can be a default playback rate established based on a length of the predefined timeframe 126, the type of event 108, and/or the environment 112.

Figure 5A:
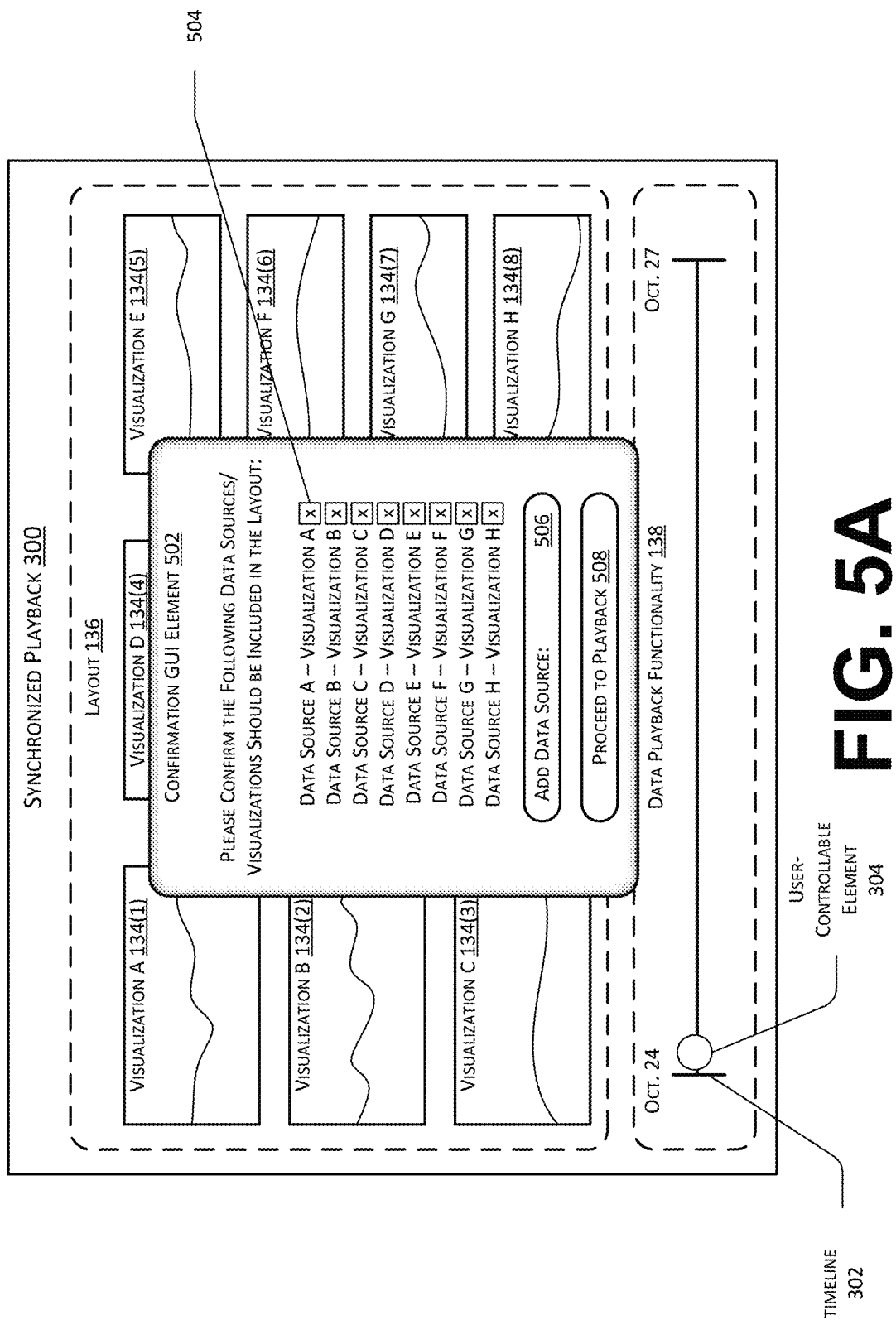
FIG. 5A illustrates an example graphical user interface based on the example graphical user interface of FIG. 3 in which a confirmation graphical user interface element is displayed so that a user can confirm and/or modify the data sources that are related to the event.

FIG. 5A illustrates an example graphical user interface based on the example graphical user interface of FIG. 3 in which a confirmation graphical user interface element 502 is displayed so that a user can confirm and/or modify the data sources that are related to the event. The confirmation graphical user interface element 502 can be presented to the user at the onset of the synchronized playback 300 (e.g., after the related data sources are identified via a mapping). As shown, the confirmation graphical user interface element 502 lists the data sources and/or visualizations (e.g., visualizations A-H 134(1-8)) that are to be included in the synchronized playback 300.

The confirmation graphical user interface element 502 can include functionality 504 to deselect, or alternatively select, each of the visualizations A-H 134(1-8). A deselection or selection modifies the visualizations that are displayed in the layout 136. In one embodiment, the user can select and/or switch between different types of visualizations (e.g. bar graphs, pie graphs, scatter plots, heat maps, box plots, line charts, maps, or a combination thereof) to provide a clear picture of a synchronized data state. Moreover, the confirmation graphical user interface element 502 can include an entry field 506 in which a user can add a data source for the synchronized playback 300. If a data source is added, then the data retrieval module 120 retrieves an additional dataset. When confirmation regarding the list of data sources is received (e.g., the user selects the "proceed to playback" graphical user interface element 508), then the layout 136 is configured to update the visualizations displayed based on the modification(s), if appropriate.

Figure 5B:
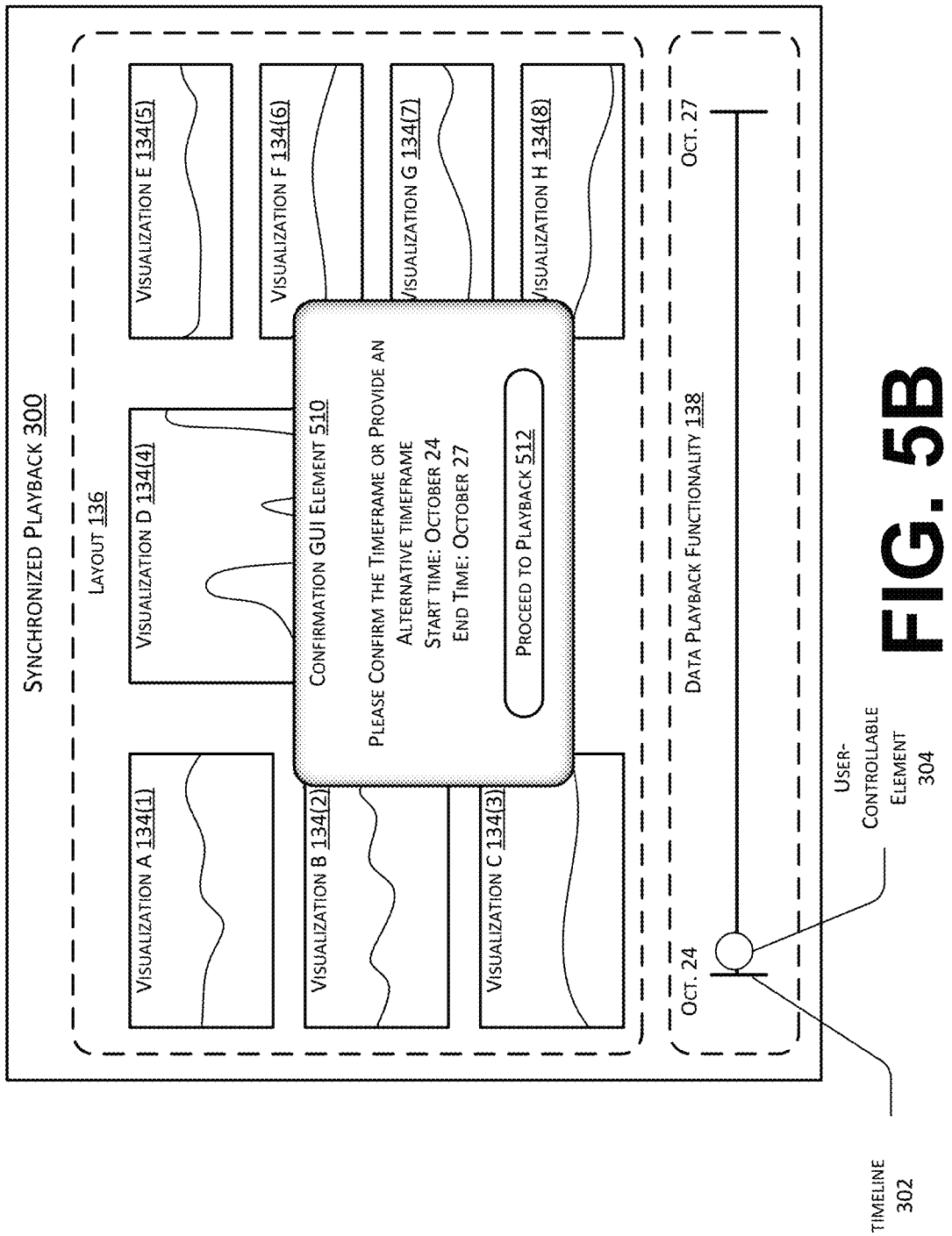
FIG. 5B illustrates an example graphical user interface based on the example graphical user interface of FIG. 3 in which a confirmation graphical user interface element is displayed so that a user can confirm and/or modify the predefined timeframe.

FIG. 5B illustrates an example graphical user interface based on the example graphical user interface of FIG. 3 in which a confirmation graphical user interface element 510 is displayed so that a user can confirm and/or modify the predefined timeframe. Again, the confirmation graphical user interface element 510 can be presented to the user at the onset of the synchronized playback 300 (e.g., after the predefined timeframe is identified via a mapping). The confirmation graphical user interface element 510 enables the user to provide input that modifies the predefined timeframe (e.g., change the start date of October 24 to an earlier or later date). When confirmation regarding the predefined timeframe is received (e.g., the user selects the "proceed to playback" graphical user interface element 512), then the timeline 302 is configured to be updated based on the modification(s), if appropriate.

Figure 6A:
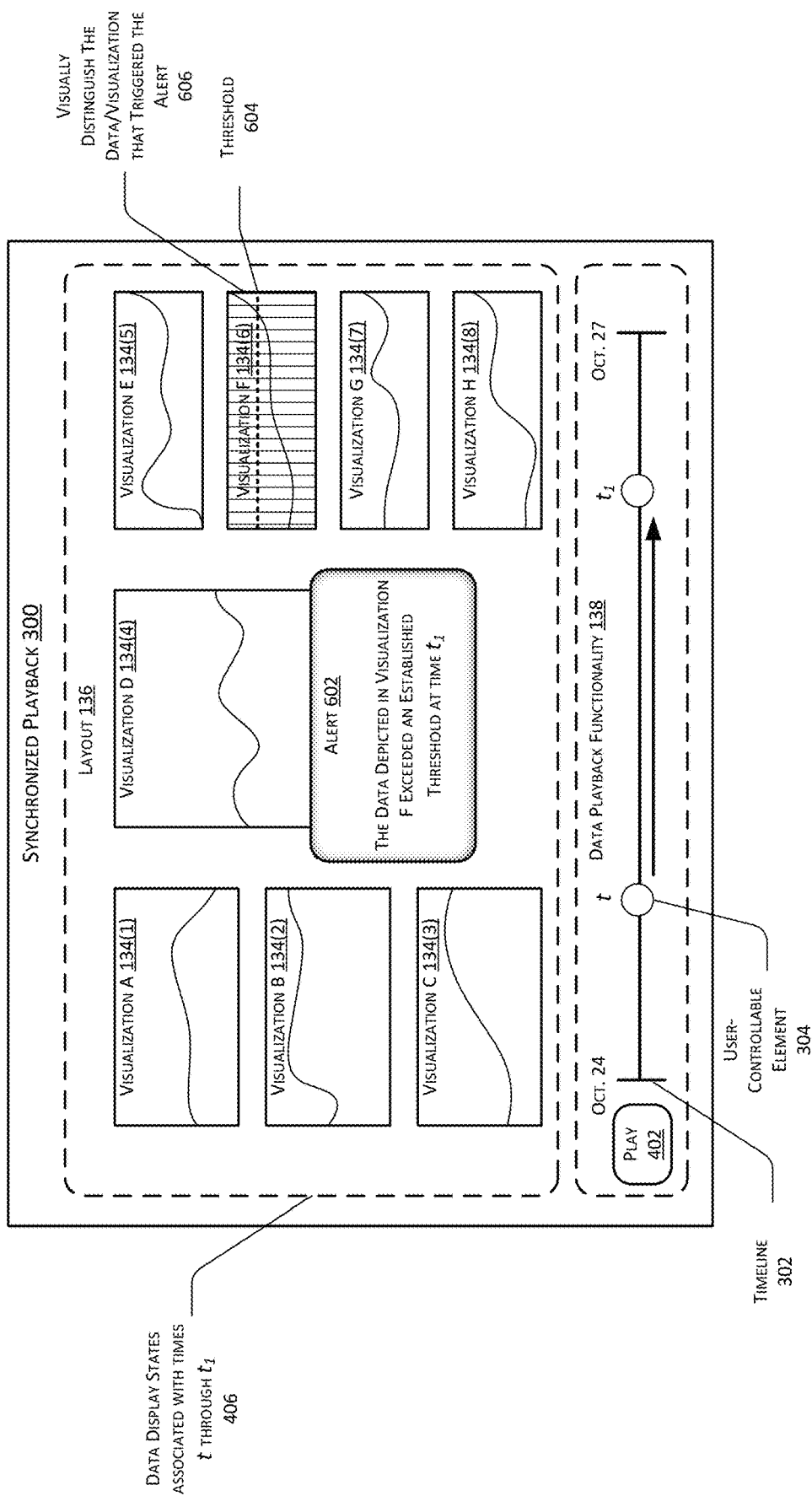
FIG. 6A illustrates an example graphical user interface based on the example graphical user interface of FIG. 4 in which an alert is triggered for a visualization.

FIG. 6A illustrates an example graphical user interface based on the example graphical user interface of FIG. 4 in which an alert 602 is triggered for a visualization. The alert 602 is triggered based on a determination that a data value in an individual dataset is above or below a data value threshold 604 established in association with the individual dataset. In FIG. 6A, the data value threshold 604 is depicted on visualization F 134(6). Accordingly, the alert 602 indicates that "The Data Depicted in Visualization F Exceeded an Established Threshold at Time $t_1$". In association with, or as an alternative to, the alert 602, the data presentation module 122 can visually distinguish visualization F 134(6) from the other visualizations, as referenced by 606 and shown by the vertical lines through visualization F 134(6). The visual distinction 606 is intended to accentuate visualization F 134(6) so the user can direct their focus to the data displayed therein and better understand the complex data scenario being played back.

Figure 6B:
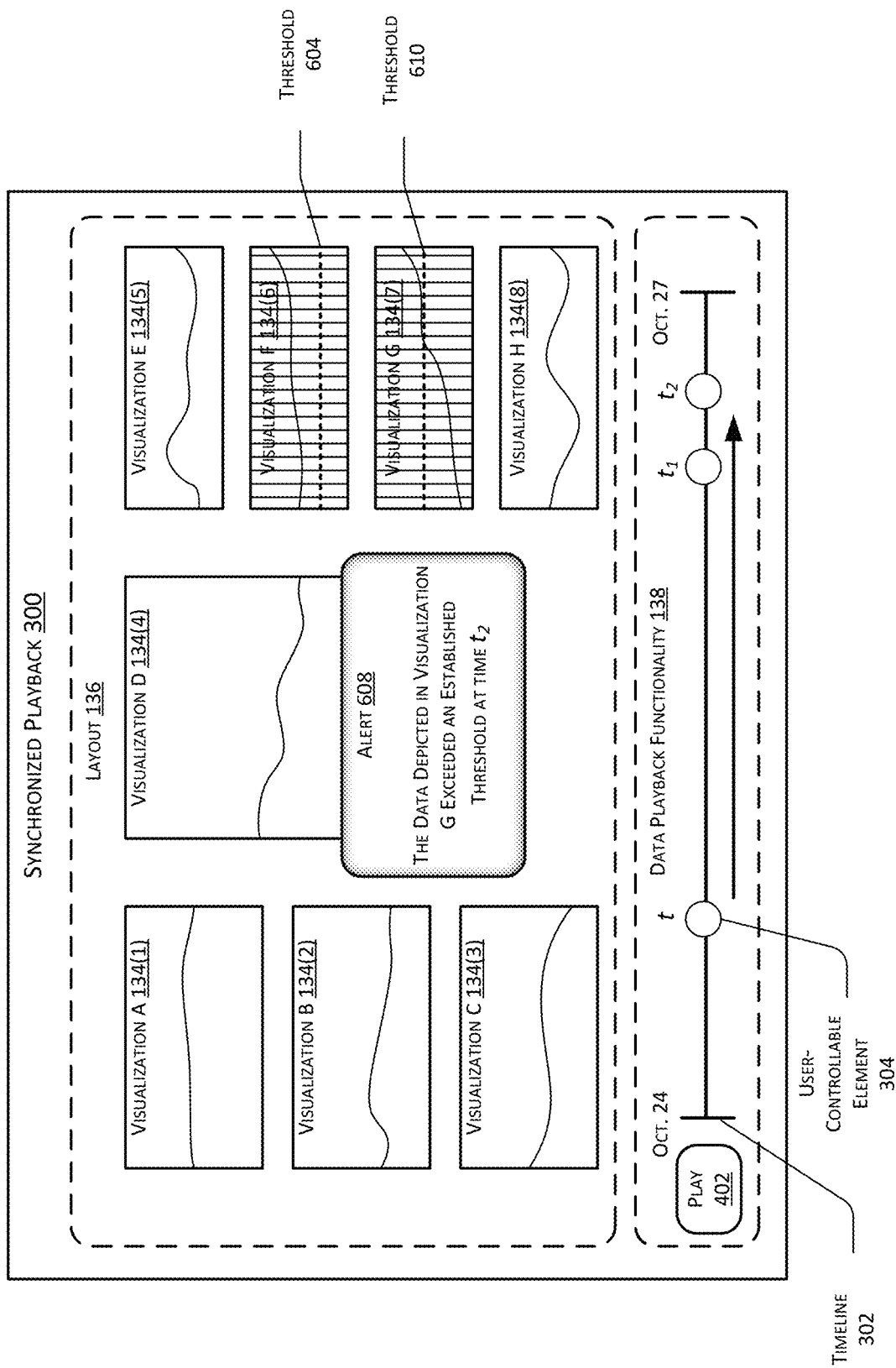
FIG. 6B illustrates an example graphical user interface based on the example graphical user interface of FIG. 6A in which another alert is triggered for another visualization after the alert in FIG. 6A.

FIG. 6B illustrates an example graphical user interface based on the example graphical user interface of FIG. 6A in which another alert 608 is triggered for another visualization after the alert 602 in FIG. 6A. The alert 608 is triggered at time $t_2$ as the data presentation module 122 plays through a sequence of data display states). In FIG. 6B, the alert 608 is associated with visualization G 134(7). Accordingly, FIG. 6B illustrates a data value threshold 610 on visualization G 134(7) and the alert 608 indicates that "The Data Depicted in Visualization G Exceeded an Established Threshold at Time $t_2$". In association with, or as an alternative to, the alert 608, the data presentation module 122 can visually distinguish visualization G 134(7) from the other visualizations, as shown by the vertical lines through visualization G 134(7).

The ability for the techniques described herein to enable a user to view a series of triggered alerts helps a user understand complex data scenarios in an effective and efficient manner. For example, a user can conclude that the reasons for the alert 602 triggered at time $t_1$ is a root cause of the reasons for the alert 608 triggered at time $t_2$.

FIG. 7 illustrates an example graphical user interface based on the example graphical user interface of FIG. 3 in which a current position of the user-controllable element 304 on the timeline 302 is associated with a future time $t_f$ 702 that occurs after the present time. In this example, the system 102 can further include a prediction module 704 that is configured to receive, as inputs, the datasets 130 and predict a future data display state 706 for a future time $t_f$ 702 as an output. In this way, a user can view where the data is going in the future and/or when a more drastic event is predicted to occur (e.g., when an alert is predicted to occur-similar to the discussions of FIGS. 6A and 6B).

The prediction module 704 is configured to implement any type of predictive model that can be applied to the input datasets 130. Accordingly, the predictive model can use any one of neural networks (e.g., convolutional neural networks, recurrent neural networks such as Long Short-Term TRansformer, etc.), Naïve Bayes, k-nearest neighbor algorithm, majority classifier, support vector machines, random forests, boosted trees, Classification and Regression Trees (CART), and so on.

Figure 8:
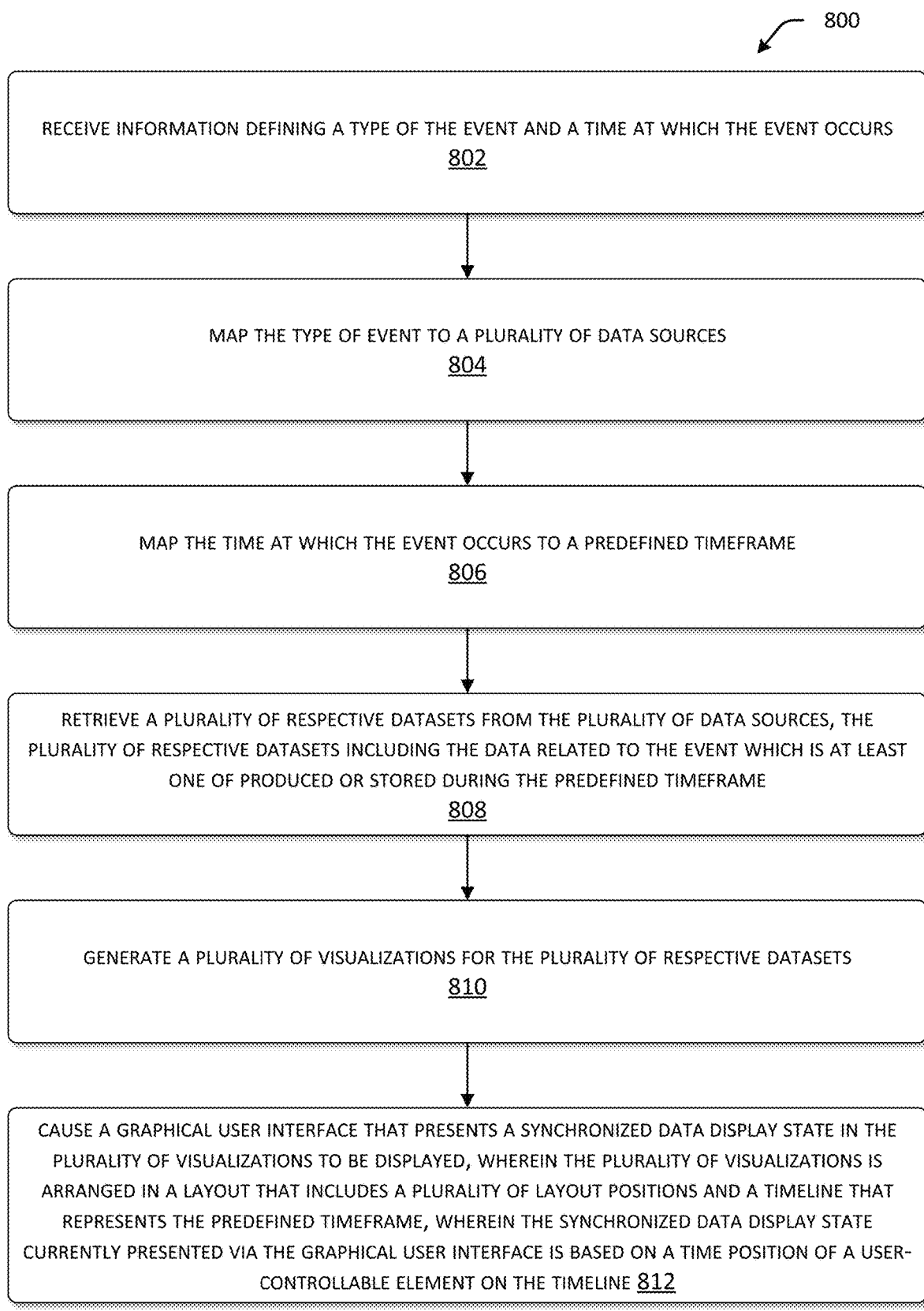
FIG. 8 is an example flow diagram showing aspects of a method implemented to provide synchronized playback of an event from the perspective of data sources that are related to the event.

Turning now to FIG. 8, an example flow diagram of a method implemented to provide synchronized playback of an event from the perspective of data sources that are related to the event is shown.

At operation 802, information defining a type of the event and a time at which the event occurs is received. Defining the event may be broad or specific. For example, an event such as a power outage may be broader, while a stressed supply chain for electrical vehicles is more specifically defined.

At operation 804, the type of event is mapped to a plurality of data sources. The type of event is mapped to a plurality of data sources through associating the defined event with related data sources. For example, in FIG. 2A the mapping 212 associates the "Stressed Supply Chain for Electrical Vehicles" event to the following related data sources: "Production Time Per Unit Data Source", "Number of Defective EV Parts Data Source", and "Shipment Time to Customer Data Source". The mapping 212 further associates the Stressed Supply Chain for Electrical Vehicles" event to the predefined timeframe of "Six Months Prior to When Synchronized Data Playback Request is Received".

At operation 806, the time at which the event occurs is mapped to a predefined timeframe. For example, in FIG. 2A, the mapping 212 further associates the Stressed Supply Chain for Electrical Vehicles" event to the predefined timeframe of "Six Months Prior to When Synchronized Data Playback Request is Received".

At operation 808, a plurality of respective datasets is retrieved from the plurality of data sources. The plurality of respective datasets include the data related to the event which is at least one of produced or stored during the predefined timeframe. The data included in the retrieved datasets is likely to exhibit behavior that is related to the event (e.g., is a root cause of the event, indicates when the event will occur, predicts that the event will occur). For example, when analyzing a "Stressed Supply Chain for Electrical Vehicles," the root cause may be understaffing of the production line.

At operation 810, a plurality of visualizations is generated for the plurality of respective datasets. These visualizations may include bar graphs, pie graphs, scatter plots, heat maps, box plots, line charts, maps, or a combination thereof.

At operation 812, a graphical user interface that presents the plurality of visualizations in a layout that includes a plurality of layout positions and a timeline that represents the predefined timeframe is caused to be displayed (e.g., generated, communicated over a network to a computing device of a user). As described above, a synchronized data display state currently presented via the graphical user interface is based on a time position of a user-controllable element on the timeline. Moreover, the graphical user interface enables a user to adjust the time position based on their analysis of the visualizations. For example, when analyzing a "Stressed Supply Chain for Electrical Vehicles," the user may adjust the timeline forwards or backwards depending on a recognized data pattern.

For ease of understanding, the method discussed in this disclosure are delineated as separate operations represented as independent blocks. However, these separately delineated operations should not be construed as necessarily order dependent in their performance. The order in which the method is described is not intended to be construed as a limitation, and any number of the described blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein may be referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Figure 9:
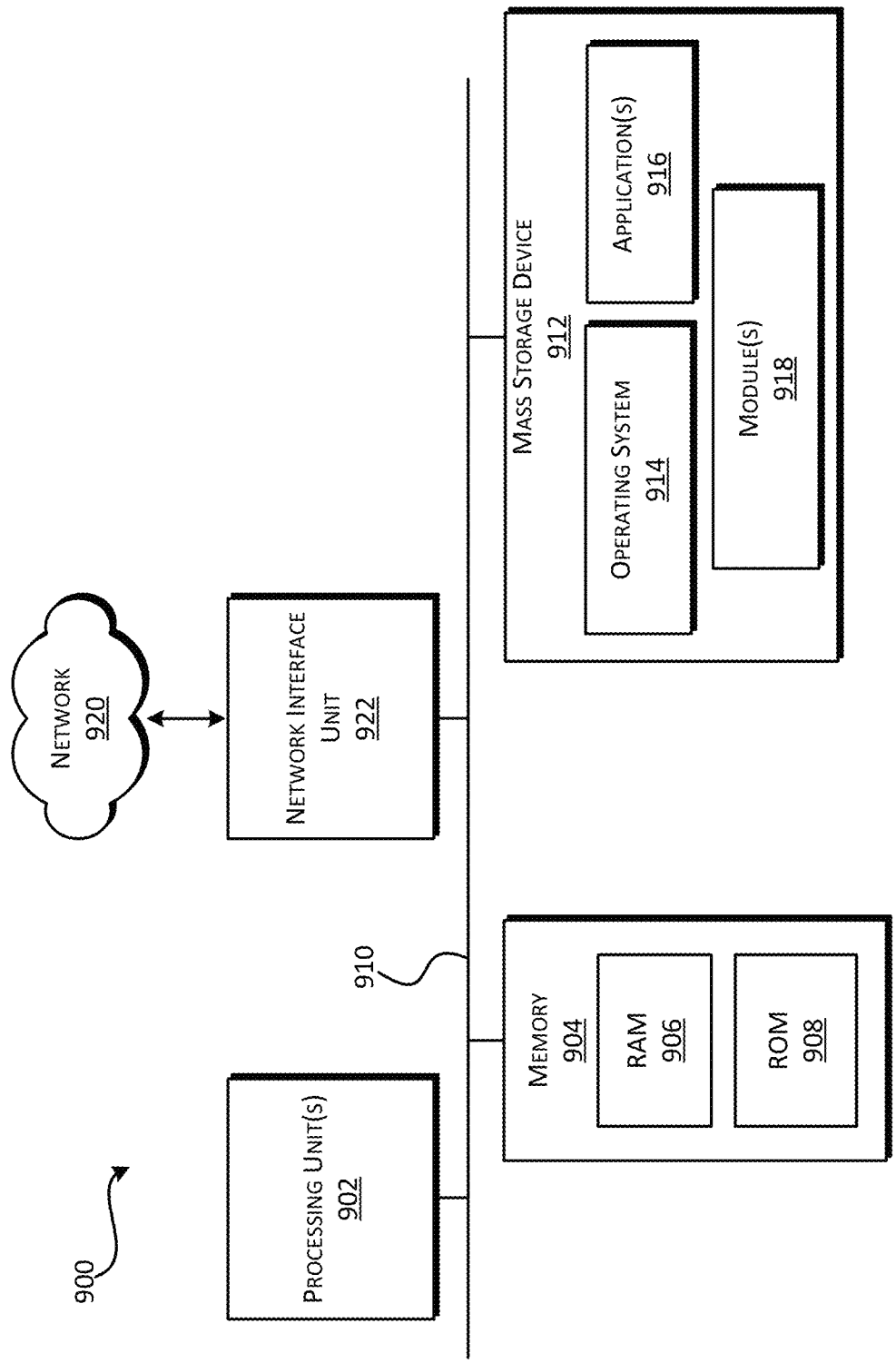
FIG. 9 is a computer architecture diagram showing an illustrative computer hardware and software architecture for a computing system capable of implementing aspects of the techniques and technologies presented herein.

FIG. 9 shows additional details of an example computer architecture 900 for a device, such as a computer or a server capable of executing computer instructions. The computer architecture 900 illustrated in FIG. 9 includes processing unit(s) 902, a system memory 904, including a random-access memory 906 (RAM) and a read-only memory (ROM) 908, and a system bus 910 that couples the memory 904 to the processing unit(s) 902. The processing units 902 may also comprise or be part of a processing system. In various examples, the processing units 902 of the processing system are distributed. Stated another way, one processing unit 902 of the processing system may be located in a first location (e.g., a rack within a datacenter) while another processing unit 902 of the processing system is located in a second location separate from the first location.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

The disclosure presented herein also encompasses the subject matter set forth in the following clauses.

Example Clause A, a method for providing synchronized playback of data related to an event comprising: receiving information defining a type of the event and a time at which the event occurs; mapping, by a processing system, the type of event to a plurality of data sources; mapping the time at which the event occurs to a predefined timeframe; retrieving a plurality of respective datasets from the plurality of data sources, the plurality of respective datasets including the data related to the event which is at least one of produced or stored during the predefined timeframe; generating a plurality of visualizations for the plurality of respective datasets; and causing a graphical user interface that presents a synchronized data display state in the plurality of visualizations to be displayed, wherein the plurality of visualizations is arranged in a layout that includes a plurality of layout positions and a timeline that represents the predefined timeframe, wherein the synchronized data display state presented via the graphical user interface is based on a time position of a user-controllable element on the timeline.

Example Clause B, the method of Example Clause A, further comprising playing through a plurality of synchronized data display states at a playback rate.

Example Clause C, the method of Example Clause B, wherein the playback rate is defined based on user input.

Example Clause D, the method of Example Clause B, wherein the playback rate comprises a default playback rate established based on a length of the predefined timeframe.

Example Clause E, the method of any one of Example Clauses B through D, further comprising: determining that a portion of the data that corresponds to a dataset of the plurality of respective datasets triggers an alert based on a data value in the portion of the data being above or below a data value threshold established in association with the dataset; and visually distinguishing a visualization of the plurality of visualizations that corresponds to the dataset from other visualizations of the plurality of visualizations.

Example Clause F, the method of any one of Example Clauses A through E, wherein the time position is associated with a future time, the method further comprising predicting the synchronized data display state presented via the graphical user interface based on the plurality of respective datasets retrieved from the plurality of data sources.

Example Clause G, the method of any one of Example Clauses A through F, further comprising: causing a confirmation graphical user interface element that lists the plurality of data sources to be displayed; and receiving input that: confirms that a dataset of the plurality of respective datasets is to have a corresponding visualization presented in the graphical user interface; or adds a data source to the plurality of data sources for retrieval of an additional dataset.

Example Clause H, the method of any one of Example Clauses A through G, further comprising: causing a confirmation graphical user interface element that defines the predefined timeframe to be displayed; and receiving input that confirms the predefined timeframe or modifies the predefined timeframe.

Example Clause I, the method of any one of Example Clauses A through H, further comprising using an artificial intelligence model to define a first mapping of the type of event to the plurality of data sources and to define a second mapping of the time at which the event occurs to the predefined timeframe.

Example Clause J, the method of any one of Example Clauses A through H, wherein a first mapping of the type of event to the plurality of data sources and a second mapping of the time at which the event occurs to the predefined timeframe is defined based on user input.

Example Clause K, a system for providing synchronized playback of data related to an event comprising: a processing system; and computer-readable storage media storing instructions that, when executed by the processing system, cause the system to perform operations comprising: receiving information defining a type of the event and a time at which the event occurs; mapping the type of event to a plurality of data sources; mapping the time at which the event occurs to a predefined timeframe; retrieving a plurality of respective datasets from the plurality of data sources, the plurality of respective datasets including the data related to the event which is at least one of produced or stored during the predefined timeframe; generating a plurality of visualizations for the plurality of respective datasets; and causing a graphical user interface that presents a synchronized data display state in the plurality of visualizations to be displayed, wherein the plurality of visualizations is arranged in a layout that includes a plurality of layout positions and a timeline that represents the predefined timeframe, wherein the synchronized data display state currently presented via the graphical user interface is based on a time position of a user-controllable element on the timeline.

Example Clause L, the system of Example Clause K, wherein the playback rate comprises a default playback rate established based on a length of the predefined timeframe.

Example Clause M, the system of Example Clause K or Example Clause L, wherein the operations further comprise: determining that a portion of the data that corresponds to a dataset of the plurality of respective datasets triggers an alert based on a data value in the portion of the data being above or below a data value threshold established in association with the dataset; and visually distinguishing a visualization of the plurality of visualizations that corresponds to the dataset from other visualizations of the plurality of visualizations.

Example Clause N, the system of any one of Example Clauses K through M, wherein the time position is associated with a future time, and the operations further comprise predicting the synchronized data display state presented via the graphical user interface based on the plurality of respective datasets retrieved from the plurality of data sources.

Example Clause O, the system of any one of Example Clauses K through N, wherein the operations further comprise: causing a confirmation graphical user interface element that lists the plurality of data sources to be displayed; and receiving input that: confirms that a dataset of the plurality of respective datasets is to have a corresponding visualization presented in the graphical user interface; or adds a data source to the plurality of data sources for retrieval of an additional dataset.

Example Clause P, the system of any one of Example Clauses K through O, wherein the operations further comprise: causing a confirmation graphical user interface element that defines the predefined timeframe to be displayed; and receiving input that confirms the predefined timeframe or modifies the predefined timeframe.

Example Clause Q, the system of any one of Example Clauses K through P, wherein the operations further comprise using an artificial intelligence model to define a first mapping of the type of event to the plurality of data sources and to define a second mapping of the time at which the event occurs to the predefined timeframe.

Example Clause R, the system of any one of Example Clauses K through P, wherein a first mapping of the type of event to the plurality of data sources and a second mapping of the time at which the event occurs to the predefined timeframe is defined based on user input.

Example Clause S, computer-readable storage media storing instructions that, when executed by a processing system, cause a system to perform operations comprising: receiving information defining a type of an event and a time at which the event occurs; mapping the type of the event to a plurality of data sources; mapping the time at which the event occurs to a predefined timeframe; retrieving a plurality of respective datasets from the plurality of data sources, the plurality of respective datasets including data related to the event which is at least one of produced or stored during the predefined timeframe; generating a plurality of visualizations for the plurality of respective datasets; and causing a graphical user interface that presents a synchronized data display state in the plurality of visualizations to be displayed, wherein the plurality of visualizations is arranged in a layout that includes a plurality of layout positions and a timeline that represents the predefined timeframe, wherein the synchronized data display state currently presented via the graphical user interface is based on a time position of a user-controllable element on the timeline.

Example Clause T, the computer-readable storage media of claim 19, wherein the operations further comprise playing through a plurality of synchronized data display states at a playback rate.

While certain example embodiments have been described, these embodiments have been presented by way of example only, and are not intended to limit the scope of the inventions disclosed herein. Thus, nothing in the foregoing description is intended to imply that any particular feature, characteristic, step, component, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different datasets, two different visualizations).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for providing synchronized playback of data related to an event comprising:
    receiving information defining a type of the event, from a plurality of types of events, and a time at which the event occurs;
    associating, by a processing system via the use of a mapping structure for the plurality of types of events, the type of event with a mapping that identifies a plurality of data sources and that determines a predefined timeframe based on the time at which the event occurs;
    retrieving a plurality of respective datasets from the plurality of data sources, the plurality of respective datasets including the data related to the event which is at least one of produced or stored during the predefined timeframe;
    generating a plurality of visualizations for the plurality of respective datasets; and
    causing a graphical user interface that presents a synchronized data display state in the plurality of visualizations to be displayed, wherein:
        the plurality of visualizations is arranged in a layout that includes a plurality of layout positions and a timeline that represents the predefined timeframe; and
        the synchronized data display state presented via the graphical user interface is based on a time position of a user-controllable element on the timeline.

2. The method of claim 1, further comprising playing through a plurality of synchronized data display states at a playback rate.

3. The method of claim 2, wherein the playback rate is defined based on user input.

4. The method of claim 2, wherein the playback rate comprises a default playback rate established based on a length of the predefined timeframe.

5. The method of claim 2, further comprising:
    determining that a portion of the data that corresponds to a dataset of the plurality of respective datasets triggers an alert based on a data value in the portion of the data being above or below a data value threshold established in association with the dataset; and
    visually distinguishing a visualization of the plurality of visualizations that corresponds to the dataset from other visualizations of the plurality of visualizations.

6. The method of claim 1, wherein the time position is associated with a future time, the method further comprising predicting the synchronized data display state presented via the graphical user interface based on the plurality of respective datasets retrieved from the plurality of data sources.

7. The method of claim 1, further comprising:
    causing a confirmation graphical user interface element that lists the plurality of data sources to be displayed; and
    receiving input that:
        confirms that a dataset of the plurality of respective datasets is to have a corresponding visualization presented in the graphical user interface; or
        adds a data source to the plurality of data sources for retrieval of an additional dataset.

8. The method of claim 1, further comprising:
    causing a confirmation graphical user interface element that defines the predefined timeframe to be displayed; and
    receiving input that confirms the predefined timeframe or modifies the predefined timeframe.

9. The method of claim 1, further comprising using an artificial intelligence model to define the mapping that identifies the plurality of data sources and that determines the predefined timeframe based on the time at which the event occurs.

10. The method of claim 1, wherein the mapping that identifies the plurality of data sources and that determines the predefined timeframe based on the time at which the event occurs is defined based on user input.

11. A system for providing synchronized playback of data related to an event comprising:
    a processing system; and
    computer-readable storage media storing instructions that, when executed by the processing system, cause the system to perform operations comprising:
        receiving information defining a type of the event, from a plurality of types of events, and a time at which the event occurs;
        associating, via the use of a mapping structure for the plurality of types of events, the type of event with a mapping that identifies a plurality of data sources and that determines a predefined timeframe based on the time at which the event occurs;

retrieving a plurality of respective datasets from the plurality of data sources, the plurality of respective datasets including the data related to the event which is at least one of produced or stored during the predefined timeframe;

generating a plurality of visualizations for the plurality of respective datasets; and causing a graphical user interface that presents a synchronized data display state in the plurality of visualizations to be displayed, wherein:

the plurality of visualizations is arranged in a layout that includes a plurality of layout positions and a timeline that represents the predefined timeframe; and the synchronized data display state currently presented via the graphical user interface is based on a time position of a user-controllable element on the timeline.

12. The system of claim 11, wherein the playback rate comprises a default playback rate established based on a length of the predefined timeframe.

13. The system of claim 12, wherein the operations further comprise:

determining that a portion of the data that corresponds to a dataset of the plurality of respective datasets triggers an alert based on a data value in the portion of the data being above or below a data value threshold established in association with the dataset; and visually distinguishing a visualization of the plurality of visualizations that corresponds to the dataset from other visualizations of the plurality of visualizations.

14. The system of claim 11, wherein the time position is associated with a future time, and the operations further comprise predicting the synchronized data display state presented via the graphical user interface based on the plurality of respective datasets retrieved from the plurality of data sources.

15. The system of claim 11, wherein the operations further comprise:

causing a confirmation graphical user interface element that lists the plurality of data sources to be displayed; and receiving input that:

confirms that a dataset of the plurality of respective datasets is to have a corresponding visualization presented in the graphical user interface; or adds a data source to the plurality of data sources for retrieval of an additional dataset.

16. The system of claim 11, wherein the operations further comprise:

causing a confirmation graphical user interface element that defines the predefined timeframe to be displayed; and receiving input that confirms the predefined timeframe or modifies the predefined timeframe.

17. The system of claim 11, wherein the operations further comprise using an artificial intelligence model to define the mapping that identifies the plurality of data sources and that determines the predefined timeframe based on the time at which the event occurs.

18. The system of claim 11, wherein the mapping that identifies the plurality of data sources and that determines the predefined timeframe based on the time at which the event occurs is defined based on user input.

19. Computer-readable storage media storing instructions that, when executed by a processing system, cause a system to perform operations comprising:

receiving information defining a type of an event, from a plurality of types of events, and a time at which the event occurs;

associating, via the use of a mapping structure for the plurality of types of events, the type of the event with a mapping that identifies a plurality of data sources and that determines a predefined timeframe based on the time at which the event occurs;

retrieving a plurality of respective datasets from the plurality of data sources, the plurality of respective datasets including data related to the event which is at least one of produced or stored during the predefined timeframe;

generating a plurality of visualizations for the plurality of respective datasets; and causing a graphical user interface that presents a synchronized data display state in the plurality of visualizations to be displayed, wherein:

the plurality of visualizations is arranged in a layout that includes a plurality of layout positions and a timeline that represents the predefined timeframe; and the synchronized data display state currently presented via the graphical user interface is based on a time position of a user-controllable element on the timeline.

20. The computer-readable storage media of claim 19, wherein the operations further comprise playing through a plurality of synchronized data display states at a playback rate.

* * * * *